H. LEWIS.
ELECTRICAL VALVE.
APPLICATION FILED OCT. 27, 1915.
1,242,003.
Patented Oct. 2, 1917.
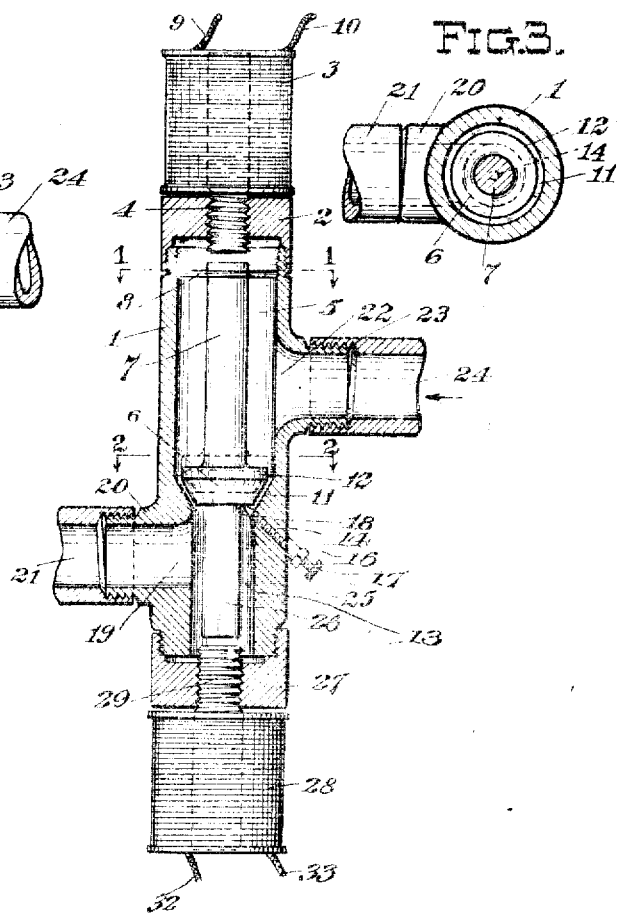
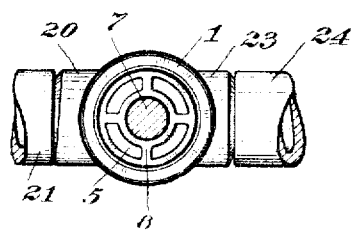
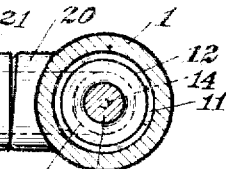
WITNESSES
Harry Lewis
INVENTOR
BY
ATTORNEY

UNITED STATES PATENT OFFICE.

HARRY LEWIS, OF PITTSBURGH, PENNSYLVANIA, ASSIGNOR OF TWO-THIRDS TO ALBERT J. LLOYD, OF PITTSBURGH, PENNSYLVANIA.

ELECTRICAL VALVE.

1,242,003.

Specification of Letters Patent.   Patented Oct. 2, 1917.

Application filed October 27, 1915.   Serial No. 58,282.

*To all whom it may concern:*

Be it known that I, HARRY LEWIS, a citizen of the United States, residing at Pittsburgh, in the county of Allegheny and State of Pennsylvania, have invented certain new and useful Improvements in Electrical Valves, of which the following is a specification.

The present invention relates to improvements in electrically operated valves, and is designed for the purpose of providing a valve which is adapted to be used on pipe lines conveying water, gas, air, steam or other fluids, the internal pressure of the fluid so carried tending to exert a pressure on the valve head and thus assist in holding same securely on the valve seat, producing a valve that is secure against leakage.

A further feature of the present invention, is there being but a comparatively small number of parts to the valve; and the electromagnets operating same being located externally with relation to the valve chamber, and hence not affected by the nature of the fluid carried, the mechanism of this form of valve is not easily deranged, and thus makes a valve which is positive and reliable in operation, and simple in construction.

By means of certain adjustable parts, as will hereinafter be explained, the valve can be regulated, so that any required amount of fluid will pass through it when in a partly closed position. A feature which is very useful in some situations, as in the case of gas for instance, where the pilot jet has to be maintained; by the use of this new valve, the valve itself furnishes a means by which the pilot jet can be provided for.

This valve having few working parts within the valve chamber, hardly any obstruction is placed in the path of flow of the fluids passing through it, when the valve is open and delivering its maximum discharge.

In the accompanying drawings I have illustrated one complete example of the preferred embodiment of my invention, showing the best modes I have so far devised for the practical application of the principles of the invention.

Figure 1 is a sectional elevation of the valve.

Fig. 2 is a cross sectional view on line 1—1 of Fig. 1.

Fig. 3 is a cross sectional view on line 2—2 of Fig. 1.

The numeral 1 designates the outer casing or shell of the valve, which is made of non-magnetic material, surmounted by a cap 2 also of non-magnetic material, and screwed to the top of the outer shell 1 as shown. Above the cap 2, is an electromagnet 3 of the usual construction; capable of being energized from a source of power through feed wires 9 and 10. Through the electromagnet 3, and valve cap 2 passes a soft iron core 4, being threaded through the latter for purposes of adjustment, and extending some distance into the valve chamber 5, as shown in the drawings. Within the valve chamber 5 is located the valve head 6, valve stem 7, and the ring 8 through which the valve stem passes, the ring forming a guide for the same, so that the valve head 6 will always come to a perfect seat on the valve seat 11. It will be noted that the distance between the top of the valve stem 7 and the bottom of the iron core 4 is regulated by the position of the latter in the head 2, the distance between the two determining the height the valve head 6 will rise off its seat 11, as is readily seen. The upper and outer edge 12 of the valve head 6 is of shape shown in order to facilitate the flow of fluid passing through the valve, when the valve is open. Within the valve passage 13, is located an adjusting screw 14 which is threaded through the wall of the valve body, and carries a lock nut 16 and a milled head 17. The purpose of said screw 14 is to control the distance between the valve seat 11, and the valve head 6 when it is desired that the valve shall remain partly open, the screw 14 preventing the head 6 from completely closing the aperture 18, thus permitting a small well governed flow of gas or other fluid through the valve. It will thus be seen that a pilot light can be maintained when the maximum flow of gas is not desired. After the adjusting screw 14 has been set at any desired point in height with relation to the under side of the valve head 6, it can be locked in position by means of lock nut 16. Opening from the side of passage 13 is a duct 19, and an extension of the valve body 20, through which connection may be made to outlet pipe 21. Also from valve chamber 5 extends duct 22 and extension 23, through which connection may be made with inlet pipe 24.

The base portion 25 of the valve body is made identical with the upper portion thereof, there being a cap 27, of non-magnetic material, and electromagnet 28 with feed wires 32 and 33; and an iron core 29, screw threaded through cap 27, all similar to the parts 2, 3 and 4, previously described. These parts on the base portion of the valve are to provide a means of bringing the valve head 6 to its seat.

By locating the electromagnet outside the valve chamber practically all danger of the destructive action of fluids passing through the valve is avoided. It is essential that the windings of the electromagnets be kept separate and apart from any such strong fluids, that would destroy them, and injure the action of the magnets, and with same the positive action of the valve. It is also seen that the iron cores being screw-threaded through the caps 2 and 27, obviates the necessity of packing boxes of any character, which is seen to be an additional safeguard against a non-reliable valve.

The operation of the valve in a position other than vertical is as follows: The opening of the valve is effected by energizing the magnet 3 from a source of power; the iron core 4 becomes magnetized and attracts valve stem 7, said stem being of suitable material, and lifts the valve head 6 off its seat, the height being governed according to the distance between the top of the valve stem 7 and the bottom of the iron core 4. The flow of the fluid is now complete, passing through 18, 13 and 19 into exit pipe 21.

When it is necessary to close the valve electromagnet 3 is deënergized and the opposite magnet 28 is energized and the iron core 29 attracts the end of the valve stem 26 and returns the valve to its seat.

Having thus fully described my invention, what I claim and desire to secure by Letters Patent is:

In combination a chambered body, open at its ends and having a lateral inlet and a lateral outlet, together with an intervening valve seat, caps of non-magnetic material for the respective ends of the said body, an electromagnet mounted externally on each cap, with its core adjustably protruding through said cap into the chamber of said body, a valve head adapted to coöperate with said seat to control communication between said inlet and said outlet, stems projecting from the respective faces of said head and serving as armatures for the respective magnets, and an adjusting screw passing obliquely through the valve body and adapted to engage the valve head whereby the valve may be maintained off its seat.

In testimony whereof, I hereby affix my signature, in the presence of two witnesses.

HARRY LEWIS.

Witnesses:
JOHN F. SWEENY,
W. A. HIRTLE.